(12) United States Patent
Jogo et al.

(10) Patent No.: US 8,785,546 B2
(45) Date of Patent: Jul. 22, 2014

(54) HYDROGENATED BLOCK COPOLYMER AND COMPOSITION CONTAINING SAME

(75) Inventors: Yosuke Jogo, Chiba (JP); Takaaki Nishikawa, Ibaraki (JP); Nobuhiro Moriguchi, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 486 days.

(21) Appl. No.: 13/060,814

(22) PCT Filed: Aug. 28, 2009

(86) PCT No.: PCT/JP2009/065065
§ 371 (c)(1),
(2), (4) Date: Jun. 17, 2011

(87) PCT Pub. No.: WO2010/024382
PCT Pub. Date: Mar. 4, 2010

(65) Prior Publication Data
US 2011/0245405 A1    Oct. 6, 2011

(30) Foreign Application Priority Data

Aug. 29, 2008    (JP) ................................. 2008-221130

(51) Int. Cl.
*C08L 53/02*    (2006.01)
*C08F 293/00*    (2006.01)

(52) U.S. Cl.
USPC ......................................... 524/534; 525/314

(58) Field of Classification Search
None
See application file for complete search history.

(56) References Cited

U.S. PATENT DOCUMENTS

| | | | |
|---|---|---|---|
| 3,634,549 A | 1/1972 | Shaw et al. | |
| 4,772,657 A | 9/1988 | Akiyama et al. | |
| 5,610,238 A | 3/1997 | Himes et al. | |
| 5,639,831 A | 6/1997 | Himes et al. | |
| 6,034,042 A | 3/2000 | Rhodes | |
| 7,220,798 B2 * | 5/2007 | Atwood et al. | 525/105 |
| 2003/0225209 A1 | 12/2003 | Handlin et al. | |
| 2003/0225210 A1 | 12/2003 | Handlin, Jr. et al. | |
| 2003/0232928 A1 | 12/2003 | Atwood et al. | |
| 2005/0154144 A1 | 7/2005 | Atwood et al. | |

FOREIGN PATENT DOCUMENTS

| | | |
|---|---|---|
| JP | 62 20551 | 1/1987 |
| JP | 2002 504589 | 2/2002 |
| JP | 2005 126657 | 5/2005 |
| JP | 2005 255857 | 9/2005 |
| JP | 2006 526699 | 11/2006 |
| WO | 2008 018445 | 2/2008 |

OTHER PUBLICATIONS

International Search Report Issued Nov. 17, 2009 in PCT/JP09/065065 filed Aug. 28, 2009.
Extended European Search Report issued on Nov. 7, 2011 in the corresponding European Application No. 09810030.8.

* cited by examiner

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

To provide a thermoplastic elastomer composition excellent in fluidity, compression set property, and flexibility, and a hydrogenated block copolymer that provides the composition. The hydrogenated block copolymer is obtained by hydrogenating a block copolymer which is obtained by reacting a living polymer represented by the following formula (1):

$$B_1\text{-}A\text{-}B_2\text{---}X \qquad (1)$$

wherein $B_1$ and $B_2$ each represent a polymer block mainly including a structural unit derived from a conjugated diene compound, A represents a polymer block mainly including a structural unit derived from a vinyl aromatic compound, and X represents an active terminal end of a living anion polymer, with a coupling agent, wherein the ratio of the mass of the polymer block $B_1$ to the total mass of $B_1$ and $B_2$ before hydrogenation is from 0.10 to 0.45; and the content of the structural unit derived from the vinyl aromatic compound is from 25 to 50 mass % based on the mass of the hydrogenated block copolymer.

12 Claims, No Drawings

HYDROGENATED BLOCK COPOLYMER AND COMPOSITION CONTAINING SAME

CROSS REFERENCE TO RELATED APPLICATION

This application is a continuation application of PCT/JP2009/065065, filed on Aug. 28, 2009, and claims priority to Japanese Patent Application No. 2008-221130, filed on Aug. 29, 2008.

TECHNICAL FIELD

The present invention concerns a hydrogenated block copolymer and a thermoplastic elastomer composition containing the same. The invention provides a thermoplastic elastomer composition excellent in fluidity, compression set property, flexibility, and weather resistance.

BACKGROUND ART

Since styrenic thermoplastic elastomers provide excellent mechanical strength, flexibility, weather resistance, ozone resistance, heat stability, and transparency when prepared as a composition, they have been utilized being molded into various kinds of cushioning materials, damping materials, sealing materials, grips, adhesives, and toys. Particularly, for the application uses of the thermoplastic elastomer compositions in direct or indirect contact with human bodies such as cushionings for beds and chairs and insoles, it is required that they have high flexibility and excellent compression set property (less compression set) and high moldability (fluidity) in combination in view of good cushioning properties upon actual use and productivity.

As compositions obtained by blending SEBS or SEPS as hydrogenated styrenic elastomers with a paraffin oil or the like capable of remarkably improving the flexibility, there have been proposed, for example, a gel composition including styrene-(ethylene/propylene)-styrene block copolymer and a nonaromatic extender liquid (Patent Document 1); a gel composition including a triblock type styrenic elastomer, a diblock type styrenic elastomer, and a softener (Patent Document 2); a gel composition including a high molecular weight triblock type styrenic elastomer, a low molecular weight triblock typo styrenic elastomer, and a softener (Patent Document 3) and a composition used for cable filling including a mineral oil or synthetic oil and, a radial hydrogenated SEBS synthetic rubber (Patent Document 4).

However, while the thermoplastic elastomer compositions disclosed in the patent documents described above are excellent in the flexibility and the compression set property, they are not always satisfactory in the fluidity and leave a room for improvement.

On the other hand, as a method of improving the fluidity of compositions, it may be considered to branch a polymer into a multi-arm type. As the compositions containing such multi-arm type polymer, there have been proposed, for example, an adhesive composition including a not uniformly branched block copolymer obtained by reacting a blend including two or more block copolymers selected from (A) $B_1$-$A_1$-$B_2$—X, (B) $A_2$-$B_3$—X, and (C) $B_4$—X ($B_1$ to $B_4$ each represent a conjugated diene block, $A_1$ and $A_2$ each represent a vinyl aromatic, hydrocarbon polymer block, and X represents an active terminal end of a living anion polymer) combined at a specific weight ratio, with a coupling agent that reacts by way of three or higher functions with the active terminal end of the living anionic polymerization or a mixture thereof, a tackifier resin, a process oil, and a stabilizer (Patent Document 5); and an adhesive composition including a multi-block copolymer of D-A-(B-A)$_n$-D$_x$ and/or (D-A-B)$_q$-Y (where A represents a vinyl aromatic hydrocarbon polymer block, B and D each represent a hydrogenated conjugated diene polymer block, n is an integer of 1 to 5, x is 0 or 1, q is 2 to 30, Y represents a polyfunctional coupling agent, and the copolymer has from 9 to 35% by weight of a vinyl aromatic hydrocarbon content) and a tackifier resin (Patent Document 6). However, the block copolymers disclosed in Patent Document 5 or 6 do not satisfy the compression set property as the composition obtained by blending a paraffin oil and the like and leave a room for the improvement.

PRIOR ART

Patent Documents

Patent Document 1: JP 7-506614A
Patent Document 2: JP 2001-151979A
Patent Document 3: JP 2001-151980A
Patent Document 4: JP 2002-184249A
Patent Document 5: JP 4-246488A
Patent Document 6: JP 9-504666A

DISCLOSURE OF THE INVENTION

In view of the problems described above, the present invention intends to provide a thermoplastic elastomer excellent in the fluidity, the compression set property, the flexibility, and the weather resistance, as well as a block copolymer that provides the composition.

The present inventors have made an earnest study for overcoming the problem described above, and have found that the problems can be solved by using a specified hydrogenated block copolymer to accomplish the invention.

The invention provides a hydrogenated block copolymer obtained by hydrogenating a block copolymer obtained by reacting a living polymer represented by the formula (1):

$$B_1\text{-}A\text{-}B_2\text{—}X \tag{1}$$

wherein $B_1$ and $B_2$ each represent a polymer block mainly including a structural unit derived from a conjugated diene compound, A represents a polymer block mainly including a structural unit derived from a vinyl aromatic compound, and X represents an active terminal end of a living anion polymer, and a coupling agent, wherein the ratio of the mass of the polymer block $B_1$ to the total mass of $B_1$ and $B_2$ before hydrogenation is from 0.10 to 0.45; and the content of the structural unit derived from the vinyl aromatic compound is from 25 to 50 mass % based on the mass of the hydrogenated block copolymer, as well as a thermoplastic elastomer composition containing the hydrogenated block copolymer.

Further, the invention also includes the following hydrogenated block copolymers as preferred embodiments;

(2) a hydrogenated block copolymer according to (1), wherein the content of the structural unit derived from the vinyl aromatic compound is from 37 to 50 mass % based on the mass of the hydrogenated block copolymer, (3) a hydrogenated block copolymer according to (1) or (2), wherein the melt flow rate (MFR) measured at 200° C. under 5 kgf is less than 0.5 g/10 min, and (4) a hydrogenated block copolymer according to any one of (1) to (3), wherein the conjugated diene compound includes a mixture of 1,3-butadiene and isoprene, and 80% or more of carbon-carbon double bonds in the polymer blocks $B_1$ and $B_2$ are hydrogenated.

Further, the invention also provides:

(5) a thermoplastic elastomer composition containing the hydrogenated block copolymer according to any one of (1) to (4) and a non-aromatic rubber softener, which contains the non-aromatic rubber softener at a ratio from 170 to 2,000 mass parts based on 100 mass parts of the hydrogenated block copolymer.

Further, the present invention also provides a molding product formed by molding the thermoplastic elastomer composition according to (5).

The invention having the constitution described above provides a thermoplastic elastomer composition excellent in the fluidity, the compression set, and the flexibility, as well as a block copolymer providing the composition.

EMBODIMENT FOR CARRYING OUT THE INVENTION

The present invention is to be described specifically.

The hydrogenated block copolymer according to the invention is a hydrogenated block copolymer obtained by hydrogenating a block copolymer obtained by reacting a living polymer represented by the formula (1):

$$B_1\text{-}A\text{-}B_2\text{---}X \quad (1)$$

wherein $B_1$ and $B_2$ each represent a block copolymer block mainly including a structural unit derived from a conjugated diene compound, A represents a polymer block mainly including a structural unit derived from a vinyl aromatic compound, and X represents an active terminal end of a living anion polymer) and a coupling agent, in which the ratio of the mass of the polymer block $B_1$ to the mass for $B_1$ and $B_2$ in total is from 0.10 to 0.45; and the content of the structural unit derived from the vinyl aromatic compound is from 25 to 50 mass % based on the mass of the hydrogenated block copolymer.

The hydrogenated block copolymer of the invention is obtained by hydrogenating the block copolymer obtained by the reaction of the living polymer represented by the following formula (1) and a coupling agent:

$$B_1\text{-}A\text{-}B_2\text{---}X \quad (1)$$

wherein $B_1$, $B_2$, A, and X are as defined above.

The polymer block A in the living polymer mainly includes a structural unit derived from a vinyl aromatic compound. "Mainly" used herein means that at least 50% of the structural units constituting the polymer block A is derived from the vinyl aromatic compound. Preferably 80% or more and more preferably 90% or more, each inclusive of 100%, of the structural units constituting the polymer block A is the structural units derived from the vinyl aromatic compound. "Derived from" used herein means that the structural unit is formed as a result of addition polymerization of the vinyl aromatic compound. The vinyl aromatic compound includes, for example, styrene, a-methyl styrene, 2-methyl styrene, 3-methyl styrene, 4-methyl styrene, 4-propyl styrene, 4-cyclohexyl styrene, 4-dodecyl styrene, 2-ethyl-4-benzyl styrene, 4-(phenylbutyl)styrene, vinyl toluene, 1-vinyl naphthalene, and 2-vinyl naphthalene. Among them, styrene, and α-methyl styrene are preferred. The polymer block A may include only one kind of the aromatic vinyl, compounds or may include two or more of them.

Further, the polymer block A may each contain other polymerizable monomer unit, for example, a unit derived from a conjugated diene, for example, 1,3-butadiene, isoprene, 2,3-dimethyl-1,3-butadiene, 1,3-pentadiene, and 1,3-hexadiene in a small amount (preferably 20 mass % or less based on the total amount of each polymer block) so long as it does not hinder the object and the effect of the invention.

The polymer block $B_1$, $B_2$ in the living polymer mainly includes a structural unit derived from a conjugated diene compound. "Mainly" used herein means that at least 50% of the structural units constituting the polymer block $B_1$, $B_2$ are derived from the conjugated diene compound. Preferably 80% or more and more preferably 90% or more, each inclusive of 100%, of the structural units constituting the polymer block $B_1$, $B_2$ are the structural units derived from the conjugated diene compound. "Derived from" used herein means that the structural unit is formed as a result of addition polymerization of conjugated diene compound. The conjugated diene compound includes, for example, 1,3-butadiene, isoprene, 2,3-dimethyl-1,3-butadiene, 1,3-pentadiene, and 1,3-hexadiene. Among them, 1,3-butadiene, isoprene, or a mixture of 1,3-butadiene and isoprene is preferred, and a mixture of 1,3-butadiene and isoprene is more preferred. In a case when the polymer block $B_1$, $B_2$ include structural units derived from the mixture of 1,3-butadiene and isoprene, the obtained hydrogenated block copolymer is excellent in the retainability of the non-aromatic rubber softener as described below.

The polymer block $B_1$, $B_2$ may include the structural unit derived only from one kind of conjugated diene compound or may include a structural unit derived from two or more of them. In a case when the polymer block $B_1$, $B_2$ includes a structural unit derived from two or more kinds of conjugated diene compounds (for example, 1,3-butadiene and isoprene), their constitutional ratio or the form of polymerization (block, random or the like) have no particular restriction. Further, the conjugated diene compound constituting the $B_1$, $B_2$ may be, of one identical species or may be different from each other.

A bonding form (micro structure) of the conjugated diene compound and the existent ratio thereof in the polymer block $B_1$, $B_2$ in the living polymer are not restricted particularly. For example, butadiene can take a 1,2-bond (vinyl bond) or 1,4-bond form, and isoprene take a 1,2-bond (vinyl bond), 3,4-bond (vinyl bond), or 1,4-bond, in which only one bond form may be present or two or more bond forms may be present. Further, any of the bond form may be present at any ratio. When the polymer block $B_1$, $B_2$ includes only the structural unit derived from 1,3-butadiene, it is preferred that 1,2-bond content (vinyl bond content) is 25% or more in order to prevent the degradation of the elastomer performance by crystallization in the hydrogenated block copolymer.

The polymer blocks $B_1$, $B_2$ may also contain a small amount (preferably 20 mass % or less based on the total amount of each polymer block) of other polymerizable monomer unit respectively, for example, a unit derived from the aromatic vinyl compound so long as it does not binder the purpose and the effect of the invention.

The ratio of the mass of the polymer block $B_1$ to the total mass of $B_1$ and $B_2$ before hydrogenation reaction can be calculated, for example, from the masses of the conjugated diene compounds to be used for synthesizing the living polymer. More specifically, the ratio can be calculated by dividing "mass of the conjugated diene compound to be used for forming the polymer block $B_1$" by "total of the mass of the conjugated diene compound to be used for forming the polymer block $B_1$ and the mass of the conjugated diene compound to be used for forming the polymer block $B_2$." Since in the production of a living polymer the monomers used are theoretically completely polymerized to give a living polymer with a narrow molecular weight distribution (uniform molecular weight), the ratio of the polymer block $B_1$ to the total mass of $B_1$ and $B_2$ can be calculated as described above.

In the living polymer, it is necessary that the ratio of the polymer block $B_1$ to the total mass of $B_1$, $B_2$ is in a range from 0.10 to 0.45 and, preferably, in a range from 0.15 to 0.40 and, more preferably, in a range from 0.20 to 0.35. Where the ratio of the polymer block $B_1$ to the total mass of $B_1$, $B_2$ is less than 0.10, the compression set property of the thermoplastic elastomer composition containing the obtained hydrogenated block copolymer is worsened. On the contrary, when it exceeds 0.45, mechanical properties, particularly, tensile elongation of the thermoplastic elastomer composition containing the obtained hydrogenated block copolymer is lowered and, the tackiness is increased which is not preferred.

In the polymer block $B_1$, $B_2$ in the hydrogenated block copolymer of the invention, it is necessary that 50% or more of the carbon-carbon double bonds derived from the conjugated diene compound are hydrogenated in view of the heat resistance and the weather resistance and it is hydrogenated preferably by 80% or more and hydrogenated more preferably by 90% or more. The hydrogenation rate can be determined by measuring the content of the carbon-carbon double bonds derived from the conjugated diene unit in the polymer block $B_1$, $B_2$ before and after hydrogenation by iodine value measurement, infrared photospectrorctetry, $^1$H-NMR spectrum, or the like and determined based on the measured values.

The hydrogenated block copolymer of the invention is preferably constituted by only one kind of the living polymer. A not uniformly branched block copolymer to be obtained by the reaction of living polymers different in block form, molecular weight, etc. in the presence of a coupling agent may be poor in tensile property and compression set property.

The weight average molecular weight of the hydrogenated block copolymer is preferably within a range from 50,000 to 1,000,000 and, more preferably, within a range from 100,000 to 800,000 and, further preferably, within a range from 200,000 to 600,000.

When the weight average molecular weight of the hydrogenated block copolymer is less than 50,000, the compression set of the thermoplastic elastomer composition containing the obtained hydrogenated block copolymer tends to be worsened. On the other hand, when it exceeds 1000,000, the moldability of the thermoplastic elastomer composition containing the obtained hydrogenated block copolymer tends to be degraded. The weight average molecular weight referred to herein means a weight average molecular weight determined by gel permeation chromatography (GPC) using polystyrene calibration, MFR (melt flow rate) of the hydrogenated block copolymer, when measured according to JIS K 7210 under the condition at a temperature of 200° C. and under a test load of 5 kgf is preferably less than 0.5 g/10 min, more preferably, less than 0.4 g/10 min and, further preferably, less than 0.3 g/10 min. When MFR of the hydrogenated block copolymer is 0.5 g/10 or more, the compression set tends to be worsened.

The content of the vinyl aromatic compound in the hydrogenated block copolymer is within a range from 25 to 50 mass % and, preferably, within a range from 37 to 50 mass % more preferably, within a range from 37 to 47 mass % and, further preferably, within a rang from 37 to 45 mass %. When the content of the vinyl aromatic compound in the obtained hydrogenated block copolymer is less than 25 mass %, the compression set property of the thermoplastic elastomer composition containing the obtained hydrogenated block copolymer is worsened. On the other hand, when it exceeds 50 mass %, the flexibility is worsened. Further, the content of vinyl aromatic compound in the hydrogenated block can be determined, for example, by $^1$H-NMR spectrum.

The hydrogenated block copolymer may have one or more functional groups such as carboxyl group, hydroxyl group, acid anhydride group, amino group, and epoxy group in the molecular chain and/or on the molecular terminal end so long as it does not binder the purpose and the effect of the invention.

The hydrogenated block copolymer can be obtained generally by polymerizing a conjugated dime compound, an aromatic vinyl compound, and a conjugated diene compound successively in an inert solvent by using an alkyl lithium compound as an initiator to prepare a living polymer, then adding a coupling agent to conduct a coupling reaction, and controlling the coupling efficiency to obtain a block copolymer and then conducting hydrogenating reaction to obtain a predetermined hydrogenated block copolymer.

The alkyl lithium compound includes, for example, methyl lithium, ethyl lithium, n-butyl lithium, sec-butyl lithium, text butyl lithium, and pentyl lithium.

The polymerization is conducted preferably in the presence of a solvent and the solvent is not particularly restricted so long as it is inert to an initiator and gives no undesired effect on the reaction and includes, for example, a saturated aliphatic hydrocarbon or aromatic hydrocarbon such as hexane, cyclohexane, heptane, octane, decane, toluene, benzene, and xylene. Further, the polymerizing reaction is conducted usually in a temperature range from 0 to 100° C. for 0.5 to 50 hr.

Further, a Lewis base may also be used as a cocatalyst upon polymerization, and the Lewis base includes, for example, ethers such as dimethyl ether, diethyl ether, tetrahydrofuran; glycol ethers such as ethylene glycol dimethyl ether, and diethylene glycol dimethyl ether; and amines such as triethylamine, N,N,N',N'-tetramethyl ethylene diamine, and N-methyl morpholin. The Lewis bases may be used each alone or two or more of them may be used.

Any known coupling agent may be used with no particular restriction. Specifically, the coupling agent includes, for example, divinyl benzene; polyvalent epoxy compounds such as epoxidized 1,2-polybutadiene, epoxidized soy bean oil, and 1,3-bis(N,N-glycidyl aminomethyl)cyclohexane; halogen compounds such as dimethyl dichlorosilane, dimethyl dibromosilane, trichlorosilane, methyl trichlorosilane, tetrachlorosilane, and tin tetrachloride; ester compounds such as methyl benzoate, ethyl benzoate, phenyl benzoate, diethyl oxalate, diethyl malonate, diethyl adipate, dioctyl adipate, dimethyl phthalate, diethyl phthalate, dimethyl isophthalate, and dimethyl terephthalate; carbonate ester compounds such as dimethyl carbonate, diethyl carbonate, and diphenyl carbonate; and alkoxysilane compounds such as dimethyldimethoxysilane, methyl trimethoxysilane, methyl triethoxysilane, tetramethoxysilane, tetraethoxysilane, bis (trimethoxysilyl)hexane, and bis(triethoxysilyl)ethane. Among them, the ester compounds and the alkoxy Wane compounds are preferred.

The coupling efficiency upon reacting the living polymer and the coupling agent is preferably 50% or more, more preferably, 60% or more and, further preferably, 70% or more. When the coupling efficiency is less than 50%, it is not preferred since the mechanical strength of the obtained thermoplastic elastomer composition is lowered. The coupling efficiency referred to herein can be determined by using elution curve of the hydrogenated block copolymer obtained by gel permeation chromatography (GPC) measurement, and dividing the area of the polymer formed by coupling (area of peak at high molecular weight side) by a sum for the area of the polymer formed by coupling and the area of the unreacted polymer (area of peak at low molecular weight side). The elution curve of the polymer produced by coupling is bimodal in most cases, wherein polymers formed by coupling such as dimer, trimer, tetramer, etc. of living polymers are shown by a single peak (peak 1) and polymers not coupled are shown by another peak (peak 2). When peak 1 and peak 2 overlap each other, the area surrounded by peak 1, the base line of elution curve and the straight line perpendicular to the base line and passing through the bottom point of the valley between the peaks is taken as the area of the polymers formed by coupling, and the area surrounded by peak 2, the base line and straight line and the straight line is taken as the area of polymers not coupled. The coupling efficiency can be improved by increasing the addition amount of the coupling agent, elevating the reaction temperature or making the reaction time longer.

The branching factor of the hydrogenated block copolymer is preferably 2.3 or more, more preferably, 2.4 or more and, further preferably, 2.6 or more. The compression set property can be improved by increasing the branching factor. The branching factor referred to herein is a factor determined by dividing the weight average molecular weight (Mw) of the polymer formed by the coupling by the weight average molecular weight (Mw) of the not coupling-reacted polymer obtained by the measurement of gel permeation chromatography of the obtained hydrogenated block copolymer. When peak 1 and peak 2 overlap each other as described above, peak 1 and peak 2 are separated by the perpendicular line between these peaks in the same manner as above and then each of Mw of polymer formed by coupling and Mw of polymer not coupled. The branching factor can be controlled depending on the number of functional groups of the coupling agent capable of reacting with the active terminal end of the living anionic polymer. Usually, a block copolymer of high branching factor can be obtained by using a coupling agent having many functional groups capable of reacting with the active terminal end of the living anionic polymer and the branching factor can be increased to 2.3 or more by using a coupling agent capable of reacting with 3 or higher functionality.

Coupling and hydrogenation may be Conducted successively or hydrogenation may be conducted after isolating the block copolymer.

In a case of isolating the block copolymer, the block copolymer can be isolated by conducting polymerization by the method described above and then pouring the polymerization reaction solution to a poor solvent for the block copolymer such as methanol to coagulate the block copolymer, or pouring the polymerization reaction solution together with steams in hot water and removing the solvent by azeotropy (steam stripping) and then drying the same.

The hydrogenation reaction of the block copolymer can be conducted under the presence of a hydrogenation catalyst such as Raney nickel; a heterogeneous catalyst including a Metal, for example, Pt, Pd, Ru, Rh, or Ni carried on a support such as carbon, alumina or diatomaceous earths a Ziegler type catalyst including a combination of a transition metal compound (nickel octylate, nickel naphthenate, nickel actyl acetonate, cobalt octylate, cobalt naphthenate, cobalt acetyl acetonate, etc.) and an organic aluminum compound such as triethyl aluminum and tributyl aluminum or an organic lithium compound; and metallocene type catalyst including a combination of bis(cyclopentadienyl) compound of a transition metal such as titanium, zirconium, or hafnium and an organic metal compound including lithium, sodium, potassium, aluminum, zinc, or magnesium, usually under the conditions at a reaction temperature of 20 to 200° C., at a hydrogen pressure of 0.1 to 20 MPa, and for a reaction time of 0.1 to 100 hr.

When coupling and hydrogenation are conducted successively, the hydrogenated block copolymer can be isolated by pouring the hydrogenated reaction solution to a poor solvent to the hydrogenated block copolymer such as methanol and coagulating the same, or pouring the hydrogenation reaction solution together with steams into hot water, removing the solvent by azeotropy (steam stripping) and then drying the same.

The hydrogenated block copolymers constituting the thermoplastic elastomer composition of the invention may be used each alone or two or more of them may be used in admixture.

The thermoplastic elastomer composition of the invention contains the hydrogenated block copolymer and the non-aromatic rubber softener. The non-aromatic rubber softener referred to in the invention means a rubber softener in which the number of carbon atoms in the aromatic ring is less than 35% of the number of carbon atoms of the entire molecule.

The non-aromatic rubber softener includes, for example, mineral oils such as paraffinic process oil and naphthenic process oil; vegetable oils such as peanut oil and rosin; phosphate esters; low molecular polyethylene glycol; liquid paraffin; synthesis oils such as low molecular weight ethylene, ethylene-α-olefin copolymerized oligomer, liquid polybutene, liquid polyisoprene or hydrogenated products thereof liquid polybutadiene or hydrogenated products thereof. Among them, paraffinic oils such as paraffinic process oil or liquid paraffin is used suitably with a view point of compatibility with the hydrogenated block copolymer. The paraffinic oil referred to herein is an oil in which the number of carbon atoms in the paraffin chain is 50% or more of the number of carbon atoms in the entire molecule. The kinetic viscosity at 40° C. of the non-aromatic rubber softener is preferably within a range from 10 to 500 $mm^2/s$, more preferably within a range from 15 to 400 $mm^2/s$, and still more preferably within a range from 20 to 300 $mm^2/s$. They may be used each alone or two or more of them may be used together.

The content of the non-aromatic rubber softener in the thermoplastic elastomer composition of the invention, based on 100 mass parts of the hydrogenated block copolymer, is preferably within a range from 170 to 2000 mass parts, more preferably within a range from 200 to 1500 mass parts, and still more preferably within a range from 250 to 1300 mass parts. When the content of the non-aromatic rubber softener is less than 170 mass parts, the moldability of the obtained thermoplastic elastomer composition is lowered. When it exceeds 2000 mass parts, the strength of the obtained thermoplastic elastomer composition tends to be lowered remarkably.

The content of the non-aromatic rubber softener in the thermoplastic elastomer composition of the invention is, preferably, such that the content of the non-aromatic rubber softener to the entire thermoplastic elastomer composition is 50 mass % or more, more preferably, 55 mass % or more and, further preferably, 60 mass % or more. When the content of the non-aromatic rubber softener is less than 50 mass %, the moldability of the obtained thermoplastic elastomer composition tends to be lowered.

In the thermoplastic elastomer composition of the invention, in addition to the ingredient described above, various kinds of additives can be blended within a range not deteriorating the effect of the invention. The additives include, for example, antioxidants, light stabilizers, UV-absorbents, lubricants, various kinds of fillers, anticlouding agents, antiblocking agents, colorants, flame retardants, antistatics, crosslinkers, electrifying agents, antibacterial agents, antimold agents, and foaming agents. Any one of them may be used alone or two or more of them may be used in combination. When the additives are blended, the blending amount is preferably 10 mass parts or less based on 100 mass parts of the total of hydrogenated block copolymer and the non-aromatic rubber softener with a view point of the tensile strength.

In the thermoplastic elastomer composition of the invention, other thermoplastic resins can be blended in addition to the ingredients described above within a range not deteriorating the effect of the invention. The thermoplastic resins include polypropylene, high density polyethylene, medium density polyethylene, low density polyethylene, ethylene-α-olefin copolymers such as ethylene-propylene copolymer, ethylene-1-butene copolymer, ethylene-1-hexene copolymer, ethylene-1-heptene copolymer, ethylene-1-octene copolymer, ethylene-4-methyl-1-pentene copolymer, ethylene-1-nonene copolymer, and ethylene-1-decene copolymer, polyolefinic resins such as ethylene-vinyl acetate copolymer, ethylene-acrylic acid copolymer, ethylene-acrylate ester copolymer, ethylene-methacrylic acid copolymer, and ethylene-methacrylate ester copolymer or resins modifying them with maleic acid anhydride or the like, polystyrenic resins such as polystyrene, poly α-methyl styrene, polyparamethyl styrene, acrylonitrile-styrene resin, acrylonitrile-butadiene-styrene resin, maleic acid anhydride-styrene resin, and polyphenylene ether, and thermoplastic elastomers such as olefinic elastomer, styrenic elastomer, urethanic elastomer, amide-type elastomer, and ester type elastomer. The thermoplastic resins can be used each alone or two or more of them may be used together. When other thermoplastic resins are blended, the blending amount is preferably 50 mass parts or less based on 106 mass parts of the total of the hydrogenated block copolymer and the non-aromatic rubber softener with the view point of the flexibility.

By mixing the hydrogenated block copolymer and the non-aromatic rubber softener described above, the thermoplastic elastomer composition of the invention can be produced. Mixing can be conducted by a customary method and can be conducted, for example, by uniformly mixing using a nailing apparatus such as a Henschel mixer, ribbon blender, V-type blender, etc. and then melt-kneading the mixture using a kneading apparatus such as a mixing roll, kneader, Banbury mixer, Brabender mixer, a single or twin screw extruder. Kneading is conducted generally at 120 to 250° C.

EXAMPLES

The present invention is to be described more specifically by way of examples but the invention is not restricted to the examples. In the following examples and comparative examples, physical properties of the hydrogenated block copolymers and the thermoplastic elastomer compositions were evaluated by the following methods.

(1) Hydrogenation Rate, Styrene Content, Vinyl Bond Content

They were calculated based on $^1$H-MNR spectrum.
Apparatus: JNM-Lambda 500 (manufactured by JEOL Limited)
Solvent: deuterated chloroform
Measuring temperature: 50° C.

(2) Weight Average Molecular Weight (Mw), Molecular Weight Distribution (Mw/Mn)

The weight average molecular weight (Mw), the number average molecular weight (Mn), and the molecular weight distribution (Mw/Mn) of total of the coupled polymer and the non-coupled polymer (hydrogenated block copolymer) were determined by gel permeation chromatography (GPC) using polystyrene calibration. In addition, the weight average molecular weight (Mw) and the number average molecular weight (Mn) of each of the coupled polymer and the non-coupled polymer were determined in the same manner. When the elution peak of the coupled polymer (peak 1) and the elution peak of the non-coupled peak (peak) overlapped each other, the peaks were separated to the peak at high molecular weight side and the peak at low molecular weight side by the line perpendicular to the base line and passing through the bottom point of the valley between the peaks. The peak at high molecular weight side was taken as the peak of the coupled polymer and the peak at low molecular weight side was taken as the peak of the non-coupled polymer.

Apparatus: GPC-8020 (manufactured by Tosoh Corporation)
Solvent: Tetrahydrofuran (THF)
Measuring temperature: 40° C., flow rate: 1 ml/min
Injection amount: 150 µl
Concentration: 5 mg/10 cc (hydrogenated block copolymer/THF)

(3) Coupling Efficiency

The coupling efficiency was determined by dividing the peak area of the coupled polymer by the total of the peak area of the coupled polymer and the peak area of the non-coupled polymer obtained by GPC.

(4) Branching Factor

Branching factor was calculated by dividing the weight average molecular weight (Mw) of the coupled polymer by the weight average molecular weight (Mw) of the non-coupled polymer obtained by GPC.

(5) MFR

MFR of the hydrogenated block polymer was measured according to JIS K 7210 under the conditions at a temperature of 200° C. and under a test load of 5 kgf.

(6) Tensile Property

A rectangular test piece of 25 mm in width, 75 mm in length, and 20 mm in inter-mark distance was punched out of a sheet of a thermoplastic elastomer composition molded to 1 mm in thickness obtained in the following examples and comparative examples, and tensile stress and elongation at break were measured by using an Instron tensile tester at a measuring temperature of 23° C. and a tensile speed of 500 mm/min. The elongation at break is preferably 500% or more, more preferably, 700% or more and, further preferably, 900% or more.

(7) Compression Set

By using a small test piece according to JIS K 6262 prepared from a thermoplastic elastomer composition obtained in the following examples and comparative examples, compression set was measured at a measuring temperature of 40° C. for a test time of 22 hr. The compression set is preferably 70% or less, more preferably, 50% or less and, further preferably, 30% or less.

(8) Melt Viscosity

The melt viscosity of the thermoplastic elastomer composition obtained in the following examples and the comparative examples was measured by using a Brookfield type rotary viscometer.

Apparatus: DV-II+ (manufactured by Brookfield Co.)

The melt viscosity is preferably 1,000,000 mPa·s or lower, more preferably, 500,000 mPa·s and, further preferably, 103,000 mPa·s or less at a measuring temperature of 160° C.

The ingredients used in the following examples and the comparative examples are described below.
Hydrogenated Block Copolymer Reference Example 1

(1) After charging 3400 ml of cyclohexane as a solvent and 5.9 ml of sec-butyl lithium at 10.5 wt % concentration as an initiator to a nitrogen replace and dried autoclave and elevating the temperature to 50° C., a mixture of isoprene and butadiene at a mass ratio=50/50 was added by 126 ml and polymerized for 2 hr. Successively, 206 ml of styrene was added and polymerized for 1 hr and, further, a mixture of isoprene and butadiene at a mass ratio of 50/50 was added by 306 ml and polymerized for 2 hr. Then, after elevating the temperature to 70° C., 6.12 g of a 5 wt % solution of dimethyl phthalate in tetrahydrofuran (THF) was added and subjected to coupling reaction for 3 hr. Then, 0.25 ml of methanol was added to stop the polymerization and obtain a polymerization reaction solution containing a block copolymer. The ratio of the mass of polymer block $B_1$ to the total mass of $B_1$ and $B_2$ ($B_1$ diene mass ratio, hereinafter referred to as "$B_1/B_1+B_2$)") of the obtained block copolymer was 0.29.

(2) 23.4 g of palladium carbon (palladium support amount: 5 mass %) was added as a hydrogenation catalyst to the polymerization reaction solution and hydrogenation reaction was conducted under a hydrogen pressure of 2 MPa, at 150° C. for 10 hr. After allowing to cool and releasing the pressure, palladium carbon was removed by filtration, the filtrate was concentrated and further dried in vacuum to obtain a hydrogenated block polymer (hereinafter referred to as hydrogenated block copolymer (R-1)). The hydrogenated block copolymer (R-1) had a styrene content of 39 mass %, a hydrogenation rate of 98.2%, a vinyl bond content of 3.2%, a weight average molecular weight of 286,300, a coupling efficiency of 78% and a branching factor of 2.9. These values are collectively shown in Table 1.

Reference Example 2

(1) After charging 3400 ml of cyclohexane as a solvent and 7.9 ml of sec-butyl lithium at 10.5 wt % concentration as an initiator to a nitrogen-replaced and dried autoclave and elevating the temperature to 50° C., a mixture of isoprene and butadiene at a mass ratio=50/50 was added by 136 ml and polymerized for 2 hr. Successively, 223 ml of styrene was added and polymerized for 1 hr and, further, a mixture of isoprene and butadiene at a mass ratio of 50/50 was added by 330 ml and polymerized for 2 hr. Then, after elevating the temperature to 70° C., 8.52 g of a 5 wt % solution of dimethyl phthalate in THF was added and subjected to coupling reaction for 3 hr. Then, 0.35 ml of methanol was added to stop the polymerization and obtain a polymerization reaction solution containing a block copolymer. The ratio, $B_1/(B_1+B_2)$, of the obtained block copolymer was 0.29.

(2) 25.3 g of palladium carbon (palladium support amount: 5 mass %) was added as a hydrogenation catalyst to the polymerization reaction solution and hydrogenation reaction was conducted in the same manner as in Reference Example 1 (2) to obtain a hydrogenated block polymer (hereinafter referred to as hydrogenated block copolymer (R-2)). The styrene content, hydrogenation rate, vinyl bond content, weight average molecular weight, coupling efficiency and branching factor of the obtained hydrogenated block copolymer (R-2) are collectively shown in Table 1.

Reference Example 3

(1) After 3400 ml of cyclohexane as a solvent, 6.9 ml of sec-butyl lithium at a 10.5 wt % concentration, and 6.3 g THF were added to a nitrogen-replaced and dried autoclave, and elevating the temperature to 50° C., 90 ml of butadiene was added and polymerized for 2 hr. Successively, 191 ml of styrene was added and polymerized for 1 hr and further 385 ml of butadiene was added and polymerized for 2 hr. Then, after elevating the temperature to 70° C., 7.30 g of a 5 wt % solution of dimethyl phthalate in THF was added and subjected to coupling reaction for 3 hr. Then, 0.30 ml of methanol was added to stop the polymerization and obtain a polymerization reaction solution containing a block copolymer. The ratio, $B_1/(B_1+B_2)$, of the obtained block copolymer was 0.19.

(2) The polymerization reaction solution was subjected to hydrogenation reaction in the same manner as in Reference Example 1 (2) to obtain a hydrogenated block polymer (hereinafter referred to as hydrogenated block copolymer (R-3)). The styrene content, hydrogenation rate, vinyl bond content, weight average molecular weight, coupling efficiency and branching factor of the obtained hydrogenated block copolymer (R-3) are collectively shown in Table 1.

Reference Example 4

(1) After charging 3400 ml of cyclohexane as a solvent and 5.6 ml of sec-butyl lithium at a 10.5 wt % concentration as an initiator to a nitrogen-replaced and dried autoclave, and elevating the temperature to 50° C., 136 ml of isoprene was added and polymerized for 2 hr. Successively, 232 ml of styrene was added and polymerized for 1 hr and further 242 ml of isoprene was added and polymerized for 2 hr. Then, after elevating the temperature to 70° C., 5.76 g of a 5 wt % solution of dimethyl phthalate in THF was added and subjected to coupling reaction for 3 hr. Then, 0.24 ml of methanol was added to stop the polymerization and obtain a polymerization reaction solution containing a block copolymer. The ratio, $B_1/B_1+B_2$), of the obtained block copolymer was 0.36.

(2) The polymerization reaction solution was subjected to hydrogenation reaction in the same manner as in Reference Example 1 (2) to obtain a hydrogenated block polymer (hereinafter referred to as hydrogenated block copolymer (R-4)). The styrene content, hydrogenation rate, vinyl bond content, weight average molecular weight, coupling efficiency and branching factor of the obtained hydrogenated block copolymer (R-4) are collectively shown in Table 1.

Reference Example 5

(1) After charging 3400 ml of cyclohexane as a solvent and 5.1 ml of sec-butyl lithium at a 10.5 wt % concentration as an initiator to a nitrogen-replaced and dried autoclave and elevating the temperature to 50° 0, a mixture of isoprene and butadiene at a mass ratio=50/50 was added by 129 ml and polymerized for 2 hr. Successively, 206 ml of styrene was added and polymerized for 1 hr and further a mixture of isoprene and butadiene at a mass ratio of 50/50 was added by 303 ml and polymerized for 2 hr. Then, after elevating the temperature to 70° C., 5.14 g of a 5 wt % solution of dimethyl phthalate in THF was added and subjected to coupling reaction for 3 hr. Then, 0.21 ml of methanol was added to stop the polymerization and obtain a polymerization reaction solution containing a block copolymer. The ratio, $B_1/(B_1+B_2)$, of the obtained block copolymer was 0.30.

(2) The polymerization reaction solution was subjected to hydrogenation reaction in the same manner as in Reference Example 1 (2) to obtain a hydrogenated block polymer (hereinafter referred to as hydrogenated block copolymer (R-5)). The styrene content, hydrogenation rate, vinyl bond content, weight average molecular weight, coupling efficiency and branching factor of the obtained hydrogenated block copolymer (R-5) are collectively shown in Table 1.

Reference Example 6

(1) After charging 3400 ml of cyclohexane as a solvent and 5.5 ml of sec-butyl lithium at a 10.5 wt % concentration as an initiator to a nitrogen-replaced and dried autoclave and elevating the temperature to 50° C., a mixture of isoprene and butadiene at a mass ratio=50/50 was added by 130 ml and polymerized for 2 hr. Successively, 144 ml of styrene was added and polymerized for 1 hr and further a mixture of isoprene and butadiene at a mass ratio of 50/50 vas added by 389 ml and polymerized for 2 hr. Then, after elevating the temperature to 70° C., 5.54 g of a 5 wt % solution of dimethyl phthalate in TI-IF was added and subjected to coupling reaction for 3 hr. Then, 0.23 ml of methanol was added to stop the polymerization and obtain a polymerization reaction solution containing a block copolymer. The ratio, $B_1/(B_1+B_2)$, of the obtained block copolymer was 0.25.

(2) The polymerization reaction solution was subjected to hydrogenation reaction in the same manner as in Reference Example 1 (2) to obtain a hydrogenated block polymer (hereinafter referred to as hydrogenated block copolymer (R-6)). The styrene content, hydrogenation rate, vinyl bond content, weight average molecular weight, coupling efficiency and branching factor of the obtained hydrogenated block copolymer (R-6) are collectively shown in Table 1.

Reference Example 7

(1) After charging 3400 ml of cyclohexane as a solvent and 7.4 ml of sec-butyl lithium at a 10.5 wt % concentration as an initiator to a nitrogen-replaced and dried autoclave and elevating the temperature to 50° C., a mixture of isoprene and butadiene at a mass ratio=50/50 was added by 126 ml and polymerized for 2 hr. Successively, 206 ml of styrene was added and polymerized for 1 hr and further a mixture of isoprene and butadiene at a mass ratio of 50/50 was added by 306 ml and polymerized for 2 hr. Then, after elevating the temperature t) 70° C., 11.1 g of a 5 wt % solution of dimethyl phthalate in THF was added and subjected to coupling reaction for 3 hr. Then, 0.33 ml of methanol was added to stop the polymerization and obtain a polymerization reaction solution containing a block copolymer. The ratio, $B_1/(B_1+B_2)$, of the obtained block copolymer was 0.29.

(2) The polymerization reaction solution was subjected to hydrogenation reaction in the same manner as in Reference Example 1 (2) to obtain a hydrogenated block polymer (hereinafter referred to as hydrogenated block copolymer (R-7)). The styrene content, hydrogenation rate, vinyl bond content, weight average molecular weight, coupling efficiency and branching factor of the obtained hydrogenated block copolymer (R-7) are collectively shown in Table 1.

Reference Example 8

(1) After charging 3400 ml of cyclohexane as a solvent and 7.4 ml of sec-butyl lithium at a 10.5 wt % concentration as an initiator to a nitrogen-replaced and dried autoclave and elevating the temperature to 50° C., a mixture of isoprene and butadiene at a mass ratio=50/50 was added by 37 ml and polymerized for 2 hr. Successively, 206 ml of styrene was added and polymerized for 1 hr and further a mixture of isoprene and butadiene at a mass ratio of 50/50 was added by 395 ml and polymerized for 2 hr. Then, after elevating the temperature to 70° C., 7.90 g of a 5 wt % solution of dimethyl phthalate in THF was added and subjected to coupling reaction for 3 hr. Then, 0.33 ml of methanol was added to stop the polymerization and obtain a polymerization reaction solution containing a block copolymer. The ratio, $B_1/(B_1+B_2)$, of the obtained block copolymer was 0.09.

(2) The polymerization reaction solution was subjected to hydrogenation reaction in the same manner as in Reference Example 1 (2) to obtain a hydrogenated block polymer (hereinafter referred to as hydrogenated block copolymer (H-1)). The styrene content, hydrogenation rate, vinyl bond content, weight average molecular weight, coupling efficiency and branching factor of the obtained hydrogenated block copolymer (H-1) are collectively shown in Table 2.

Reference Example 9

(1) After charging 3400 ml of cyclohexane as a solvent and 7.4 ml of sec-butyl lithium at a 10.5 wt % concentration as an initiator to a nitrogen-replaced and dried autoclave and elevating the temperature to 50° C., a mixture of isoprene and butadiene at a mass ratio 50/50 was added by 215 ml and polymerized for 2 hr. Successively, 206 ml of styrene was added and polymerized for 1 hr and further a mixture of isoprene and butadiene at a mass ratio of 50/50 was added by 217 ml and polymerized for 2 hr. Then, after elevating the temperature to 70° C., 7.90 g of a 5 wt % solution of dimethyl phthalate in THF was added and subjected to coupling reaction for 3 hr. Then, 0.33 ml of methanol was added to stop the polymerization and obtain a polymerization reaction solution containing a block copolymer. The ratio, $B_1/(B_1+B_2)$, of the obtained block copolymer was 0.50.

(2) The polymerization reaction solution was subjected to hydrogenation reaction in the same manner as in Reference Example 1 (2) to obtain a hydrogenated block polymer (hereinafter referred to as hydrogenated block copolymer (H-2)). The styrene content, hydrogenation rate, vinyl bond content, weight average molecular weight, coupling efficiency and branching factor of the obtained hydrogenated block copolymer (H-2) are collectively shown in Table 2.

Reference Example 10

(1) After charging 3400 ml of cyclohexane as a solvent and 5.6 ml of sec-butyl Lithium at a 10.5 wt % concentration as an initiator to a nitrogen-replaced and dried autoclave and elevating the temperature to 50° C., a mixture of isoprene and butadiene at mass ratio=50/50 was added by 115 ml and polymerized for 2 hr. Successively, 103 ml of styrene was added and polymerized for 1 hr and further a mixture of isoprene and butadiene at a mass ratio of 50/50 was added by 461 ml and polymerized for 2 hr. Then, after elevating the temperature to 70° C., 5.72 g of a 5 wt % solution of dimethyl phthalate in THF was added and subjected to coupling reaction for 3 hr. Then, 0.24 ml of methanol was added to stop the polymerization and obtain a polymerization reaction solution containing a block copolymer. The ratio, $B_1/(B_1+B_2)$, of the obtained block copolymer was 0.20.

(2) The polymerization reaction solution was subjected to hydrogenation reaction in the same manner as in Reference Example 1 (2) to obtain a hydrogenated block polymer (hereinafter referred to as hydrogenated block copolymer (H-3)). The styrene content, hydrogenation rate, vinyl bond content, weight average molecular weight, coupling efficiency and branching factor of the obtained hydrogenated block copolymer (H-3) are collectively shown in Table 2.

Reference Example 11

(1) After charging 3400 ml of cyclohexane as a solvent and 2.3 ml of sec-butyl lithium at a concentration of 10.5 wt % as an initiator to a nitrogen-replaced and dried autoclave and elevating the temperature to 50° C., 49 ml of styrene was added and polymerized for 1 hr. Further, a mixture of isoprene and butadiene at a mass ratio=50/50 was added by 317 ml and polymerized for 2 hr. Then, 49 ml of styrene was further added and polymerized for 1 hr and 0.07 ml of methanol was added to stop the polymerization and obtain a polymerization reaction solution containing a block copolymer.

(2) 14.7 g of palladium carbon (palladium support amount: 5 mass %) was added as a hydrogenation catalyst to the polymerization reaction solution and subjected to hydrogenation reaction in the same manner as in Reference Example 1 (2) to obtain a hydrogenated block copolymer (hereinafter referred to as a hydrogenated block copolymer (H-4)). The styrene content, hydrogenation rate, vinyl bond content, and weight average molecular weight of the obtained hydrogenated block copolymer (H-4) are collectively shown in Table 2.

Reference Example 12

(1) After charging 3400 ml of cyclohexane as a solvent and 4.1 ml of sec-butyl lithium at a concentration of 10.5 wt % as an initiator to a nitrogen-replaced and dried autoclave and elevating the temperature to 50° C., 80 ml of styrene was added and polymerized for 1 hr. Further, a mixture of isoprene and butadiene at a mass ratio of 50/50 was added by 497 ml and polymerized for 2 hr. Then, 80 ml of styrene was further added and polymerized for 1 hr and 0.16 ml of methanol was added to stop the polymerization to obtain a polymerization reaction solution containing the block copolymer.

(2) The polymerization reaction solution was subjected to hydrogenation reaction in the same manner as in Reference Example 1 (2) to obtain a hydrogenated block polymer (hereinafter referred to as hydrogenated block copolymer (H-5)). The styrene content, hydrogenation rate, vinyl bond content, and weight average molecular weight of the obtained hydrogenated block copolymer (H-4) are collectively shown in Table 2.

The structures and the physical properties of the hydrogenated block copolymers R-1 to R-7 and H-1 to H-5 obtained in the reference examples described above are shown in Tables 1 and 2.

TABLE 1

| Hydrogenated block copolymer | R-1 | R-2 | R-3 | R-4 | R-5 | R-6 | R-7 |
|---|---|---|---|---|---|---|---|
| $B_1$ diene mass ratio $B_1/(B_1 + B_2)$ | 0.29 | 0.29 | 0.19 | 0.36 | 0.30 | 0.25 | 0.29 |
| Kind of $B_1B_2$ diene monomer | IP/BD | IP/BD | BD | IP | IP/BD | IP/BD | IP/BD |
| Diene monomer ratio (IP/BD) | 50/50 | 50/50 | — | — | 50/50 | 50/50 | 50/50 |
| Hydrogenation rate (%) | 98.2 | 98.1 | 98.0 | 97.8 | 98.4 | 98.2 | 98.0 |
| Styrene content (wt %) | 39 | 39 | 36 | 44 | 39 | 27 | 39 |
| Vinyl bond content (%) | 3.2 | 5.1 | 39 | 3.5 | 4.7 | 6.1 | 4.6 |
| Coupling efficiency (%) | 78 | 86 | 82 | 85 | 88 | 80 | 97 |
| Branching factor | 2.9 | 3.1 | 3.0 | 2.7 | 3.0 | 3.0 | 2.0 |
| Weight average molecular weight of total hydrogenated block copolymer (Mw)* | 286300 | 246100 | 259500 | 273800 | 403300 | 364000 | 172200 |
| Molecular weight distribution of total hydrogenated block copolymer (Mw/Mn)* | 1.29 | 1.23 | 1.25 | 1.24 | 1.24 | 1.26 | 1.03 |
| Weight average molecular weight of coupled polymer (Mw)* | 334900 | 271800 | 294900 | 302400 | 438400 | 419500 | 174300 |
| Weight average molecular weight of non-coupled polymer (Mw)* | 114500 | 87800 | 98300 | 112000 | 145800 | 142200 | 87000 |
| MFR (g/10 min) | <0.5 | <0.5 | <0.5 | <0.5 | <0.5 | <0.5 | <0.5 |

*Determined by GPC measurement of hydrogenated block copolymer.

TABLE 2

| | Hydrogenated block copolymer | | | | |
|---|---|---|---|---|---|
| | H-1 | H-2 | H-3 | H-4 | H-5 |
| $B_1$ diene mass ratio $B_1/(B_1 + B_2)$ | 0.09 | 0.50 | 0.20 | — | — |
| Kind of $B_1 B_2$ diene monomer | IP/BD | IP/BD | IP/BD | IP/BD | IP/BD |
| Diene monomer ratio (IP/BD) | 50/50 | 50/50 | 50/50 | 50/50 | 50/50 |

TABLE 2-continued

| | Hydrogenated block copolymer | | | | |
|---|---|---|---|---|---|
| | H-1 | H-2 | H-3 | H-4 | H-5 |
| Hydrogenation rate (%) | 97.9 | 98.4 | 98.2 | 98.2 | 97.8 |
| Styrene content (wt %) | 39 | 39 | 20 | 29 | 30 |
| Vinyl bond content (%) | 3.1 | 4.0 | 5.9 | 6.1 | 5.2 |
| Coupling efficiency (%) | 79 | 85 | 77 | — | — |
| Branching factor | 3.1 | 3.1 | 2.6 | — | — |
| Weight average molecular weight of total hydrogenated block copolymer (Mw)* | 217300 | 267300 | 330300 | 307500 | 188000 |
| Molecular weight distribution of total hydrogenated block copolymer (Mw/Mn)* | 1.29 | 1.25 | 1.23 | 1.06 | 1.03 |
| Weight average molecular weight of coupled polymer (Mw)* | 253700 | 298100 | 377000 | — | — |
| Weight average molecular weight of non-coupled polymer (Mw)* | 83100 | 97200 | 142800 | — | — |
| MFR (g/10 min) | <0.5 | <0.5 | <0.5 | <0.5 | <0.5 |

*Determined by GPC measurement of hydrogenated block copolymer.

Non-Aromatic Rubber Softener

Paraffinic process oil (trade name of products: Diana process oil PW-32, manufactured by Idemitsu Kosan Co., Ltd., 40° C. kinetic viscosity: 30.98 mm$^2$/s).

Antioxidant

Hindered phenolic antioxidant (trade name of products: IRGANOX 1010, manufactured by Ciba Specialty Chemicals Co.)

Examples 1 to 8, Comparative Examples 1 to 5

The hydrogenated block copolymers R-1 to R-7, H-1 to H-5, the non-aromatic rubber softeners, and the antioxidants were blended at mass ratios shown in Table 3 and Table 4, preliminarily mixed previously and then melt kneaded by using a Brabender mixer at 180° C. for 5 min, to obtain each thermoplastic elastomer composition. Then, sheet products and test pieces for measuring compression set were obtained by using a press-molding machine. The obtained thermoplastic elastomer compositions were evaluated for the performance according to the methods (6) to (8) described above by using the obtained test pieces. The results are shown in Table 3 and Table 4.

TABLE 3

| | Example 1 | Example 2 | Example 3 | Example 4 | Example 5 | Example 6 | Example 7 | Example 8 |
|---|---|---|---|---|---|---|---|---|
| Hydrogenated block copolymer | | | | | | | | |
| R-1 | 100 | | | | | | | |
| R-2 | | 100 | 100 | | | | | |
| R-3 | | | | 100 | | | | |
| R-4 | | | | | 100 | | | |
| R-5 | | | | | | 100 | | |
| R-5 | | | | | | | 100 | |
| R-7 | | | | | | | | 100 |
| Non-aromatic rubber softener | 500 | 500 | 300 | 500 | 500 | 1500 | 500 | 500 |
| Antioxidant | 0.6 | 0.6 | 0.4 | 0.6 | 0.6 | 1.6 | 0.6 | 0.6 |
| Tensile property | | | | | | | | |
| 100% modulus (MPa) | 0.02 | 0.02 | 0.03 | 0.02 | 0.02 | 0.003 | 0.02 | 0.02 |
| Elongation at break (%) (Stress MPa) | 700< (0.1<) | 700< (0.19<) | 700< (0.23<) | 700< (0.17<) | 700< (0.19<) | 700< (0.03<) | 700< (0.19<) | 700< (0.14<) |
| Compression set (%) | 16 | 40 | 33 | 45 | 25 | 16 | 45 | 47 |
| Melt viscosity (mPa · s) (Measuring temperature) | 9700 (180° C.) | 5600 (160° C.) | 17000 (180° C.) | 5200 (160° C.) | 9000 (180° C.) | 1600 (160° C.) | 16300 (180° C.) | 10000 (16° C.) |

TABLE 4

| | Comp. Example 1 | Comp. Example 2 | Comp. Example 3 | Comp. Example 4 | Comp. Example 5 |
|---|---|---|---|---|---|
| Hydrogenated block copolymer | | | | | |
| H-1 | 100 | | | | |
| H-2 | | 100 | | | |
| H-3 | | | 100 | | |
| H-4 | | | | 100 | |
| H-5 | | | | | 100 |
| Non-aromatic rubber softener | 500 | 500 | 500 | 500 | 300 |
| Antioxidant | 0.6 | 0.6 | 0.6 | 0.6 | 0.4 |
| Tensile property | | | | | |
| 100% modulus (MPa) | 0.02 | 0.02 | 0.02 | 0.02 | 0.07 |
| Elongation at break (%) (Stress MPa) | 700< (0.16<) | 450 (0.09) | 700< (0.18<) | 700< (0.09<) | 700< (0.31<) |
| Compression set (%) | 55 | 47 | 85 | 13 | 25 |
| Melt viscosity | | | | | |
| (mPa · s) | 3600 | 9900 | 14100 | Measurement impossible | 760000 |
| (Measuring temperature) | (160° C.) | (160° C.) | (180° C.) | (200° C.) | (180° C.) |

From the results of Table 3 and Table 4, it can be seen that the thermoplastic elastomer compositions obtained in Examples 1 to 8 of the invention are excellent in each of fluidity, compression set property, and flexibility.

On the contrary, the result of Comparative Examples 1 to 5 was as described below.

(1) In Comparative Example 1, since the ratio, $B_1/(B_1+B_2)$, of the hydrogenated block copolymer used is smaller than specified in the invention, it can be seen that the obtained thermoplastic elastomer composition is poor in the compression set property.

(2) In Comparative Example 2, since the ratio, $B_1(B_1+B_2)$, of the hydrogenated block copolymer used is larger than specified in the invention, it can be seen that the obtained thermoplastic elastomer composition is poor in the elongation at break.

(3) In Comparative Example 3, since the content of the structural unit derived from the vinyl aromatic compound of the used hydrogenated block copolymer is low, it can be seen that the obtained thermoplastic elastomer composition is poor in the compression set property.

(4) In Comparative Examples 4, 5, since the used hydrogenated block copolymers are of ABA type, it can be seen that they have extremely high melt viscosity and are poor in the moldability.

Industrial Applicability

The thermoplastic elastomer composition of the invention is excellent in the compression set property, flexibility, weather resistance, and fluidity and does not contain substances causing environmental pollution. Therefore, the composition is effectively applicable to a wide range of fields such as sport, medical treatment, nursing care, welfare, childcare, electrical machinery, electronics, industrial appliance, toy, and miscellaneous goods as cushioning materials, damping materials, sealing materials, adhesive materials, heat radiators, sealing materials, elastic materials, heat-insulating materials, soundproofing materials, sound barrier materials, light guiding materials, and packaging materials for the production of shoes, jacket, protector, helmet, prosthetics, bandage, test artificial skim mat, pad, bed, mattress, pillow, wheelchair, child seat, baby carriage, cellular phone, digital camera, personal computer, game machine, navigation system, household electric appliance, electric tool, industrial machine, robot, automobile, ship, airplane, motor, electric generator, solar cell, optical fiber cable, optical fiber connector, furniture, stationery, insole, window flame, and candle.

What is claimed is:

1. A hydrogenated block copolymer, obtained by a process comprising hydrogenating a coupling agent and a block copolymer which is obtained by reacting a living polymer of formula (1):

$$B_1\text{-A-}B_2\text{—X} \qquad (1)$$

wherein
$B_1$ is a polymer block mainly comprising a structural unit derived from a conjugated diene compound comprising a mixture of 1,3-butadiene and isoprene,
$B_2$ is a polymer block mainly comprising a structural unit derived from the same conjugated diene compound,
A is a polymer block mainly comprising a structural unit derived from a vinyl aromatic compound,
X is an active terminal end of a living anion polymer,
80% or more of carbon-carbon double bonds in the polymer blocks $B_1$ and $B_2$ are hydrogenated,
a ratio of a mass of the polymer block $B_1$ to a total mass of $B_1$ and $B_2$ before hydrogenation is from 0.10 to 0.45, and
a content of the structural unit derived from the vinyl aromatic compound is from 25 to 50 mass % based on the mass of the hydrogenated block copolymer.

2. The hydrogenated block copolymer according to claim 1, wherein the content of the structural unit derived from the vinyl aromatic compound is from 37 to 50 mass % based on the mass of the hydrogenated block copolymer.

3. The hydrogenated block copolymer according to claim 1, wherein a melt flow rate (MFR) measured at 200° C. under 5 kgf is less than 0.5 g/10 min.

4. A thermoplastic elastomer composition, comprising:
the hydrogenated block copolymer according to claim 1; and
a non-aromatic rubber softener,
wherein a content of the non-aromatic rubber softener is from 170 to 2,000 mass parts based on 100 mass parts of the hydrogenated block copolymer.

5. A molded product, comprising:
the thermoplastic elastomer composition according to claim 4.

6. The hydrogenated block copolymer according to claim 2, wherein a melt flow rate (MFR) measured at 200° C. under 5 kgf is less than 0.5 g/10 min.

7. The hydrogenated block copolymer according to claim 2, wherein
the conjugated diene compound comprises a mixture of 1,3-butadiene and isoprene, and
80% or more of carbon-carbon double bonds in the polymer blocks $B_1$ and $B_2$ are hydrogenated.

8. The hydrogenated block copolymer according to claim 3, wherein
the conjugated diene compound comprises a mixture of 1,3-butadiene and isoprene, and
80% or more of carbon-carbon double bonds in the polymer blocks $B_1$ and $B_2$ are hydrogenated.

9. The hydrogenated block copolymer of claim 1,
wherein 80% or more of structural units of $B_1$ are obtained by a process comprising addition polymerization of the conjugated diene compound, and
80% or more of structural units of $B_2$ are obtained by a process comprising addition polymerization of the conjugated diene compound.

10. The hydrogenated block copolymer of claim 1,
wherein 90% or more of structural units of $B_1$ are obtained by a process comprising addition polymerization of the conjugated diene compound, and
90% or more of structural units of $B_2$ are obtained by a process comprising addition polymerization of the conjugated diene compound.

11. The hydrogenated block copolymer of claim 1, wherein 80% or more of structural units of A are obtained by a process comprising addition polymerization of the vinyl aromatic compound.

12. The hydrogenated block copolymer of claim 1,
wherein 20 mass % or less of A comprises a structural unit obtained by a process comprising addition polymerization of a conjugated diene.

* * * * *